Figure 2:
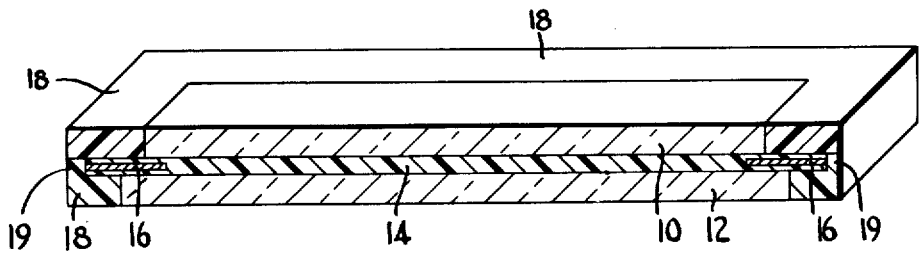

June 12, 1956   J. H. BLOOM, JR., ET AL   2,750,312
METHOD OF FABRICATING LAMINATED STRUCTURES
Filed May 25, 1953

INVENTOR
JAMES H. BLOOM and
WYMAN N. CONNOR
BY
ATTORNEY

United States Patent Office 2,750,312
Patented June 12, 1956

2,750,312

METHOD OF FABRICATING LAMINATED STRUCTURES

James H. Bloom, Jr., and Wyman N. Connor, New Kensington, Pa., assignors to Pittsburgh Plate Glass Company Application May 25, 1953, Serial No. 357,148

5 Claims. (Cl. 154—2.71)

This invention relates to an improved method of fabricating laminated structures and relates particularly to the manufacture of safety window closures having a plurality of rigid transparent sheets of glass or synthetic resin separated by at least one interlayer of a transparent thermoplastic material, wherein the edge of the plastic interlayer extends beyond the periphery of the rigid transparent sheets. The method recited herein involves the use of a novel preformed framing member to prevent plastic flow of the thermoplastic material during pressing.

The customary procedure used in fabricating laminated safety window closures of the type described above involves a complicated method of edgebuilding. By this method, the periphery of the assembly is provided with smooth surfaces and edges for the assembly prior to placing the assembly in a bag and subsequently completing the laminating process under suitable temperature and pressure conditions in an autoclave.

In the past, the edgebuilding process has included protecting both sides of the extended plastic with cellophane, applying rubber strips over the cellophane and cut out cardboard shaped pieces about the rubber, wrapping the composite structure in brown paper, and taping the assembly thus formed. The purpose of this procedure is to prevent the flow of plastic from the plastic interlayer from forming fillets about the periphery of the rigid sheets. Another object sought for the edgebuilding process is to maintain the shape of the extended edges of the plastic interlayer in its original condition.

Unfortunately, the formation of fillets cannot be prevented entirely using the hand edgebuilding method. Another drawback of the former method is the necessity for considerable additional hand labor required to prepare the rubber strips for re-use. The former practice requires the use of much material, such as the cellophane, the cardboard, the tape, and the brown paper, which cannot be reclaimed. Furthermore, considerable difficulty is encountered in removing the edge framing after lamination of the unit. Also, the edge frame work frequently fails to prevent variation in lateral dimensions of the extended edges of the plastic interlayer so that additional treatment of the units such as scraping the fillets formed and removing the cellophane from the rubber framing is necessary after the autoclave operation. In addition, a considerable number of rejects is attributed to the extra manual handling of the units.

In the manual operation formerly used, the cellophane is required to prevent lamination of the rubber and cardboard frames to the plastic extension, brown paper is taped over the glass to protect the latter from scratches likely to result from the manual handling of the units, and cardboard covers taped on the top and bottom of the unit to hold the frames in place.

According to the present invention, a plastisol is molded in the shape of a frame having dimensions sufficient to build up the periphery of the assembly to be laminated so that an assembly having smooth surfaces and edges is formed. This mold is formed of a plasticized synthetic resin that is set by baking and curing.

A primary object of the present invention is to provide an improved method of laminating assemblies containing some exposed thermoplastic material wherein the lamination is performed without causing any plastic flow of the material.

Another object of the present invention is to provide an improved method of laminating sheets of a thermoplastic material to sheets of a thermosetting material without distorting the former during the laminating operation.

Another object of the present invention is to provide an economical method of edgebuilding during the manufacture of a flat or curved laminated safety window structure so that an assembly having smooth surfaces and smooth edges is formed as a result of the edgebuilding.

Another object of the present invention is to provide re-usable, thermosetting, edgebuilding, framing members for use in laminating flat or curved safety window closure assemblies. The framing members form a snug fit about the periphery of the individual lamina that form the assembly and thereby prevent the flow of the plastic interlayer during the subsequent pressing operation in an autoclave.

Another object of the present invention is to provide a method of building laminated safety window assemblies wherein manual handling of the assembly is kept to a minimum.

Still another object of the present invention is to provide a novel step in the fabrication of a laminated assembly provided with a thermoplastic interlayer wherein the plastic flow is substantially eliminated as the assembly is laminated under conditions of high temperature and pressure.

These and other objects of the present invention will become apparent upon a study of the following description taken in connection with the accompanying drawings. It is to be understood that the invention is not to be limited to the specific embodiments which are recited herein for purposes of illustration only, but only by the scope of the appended claims.

Figure 1:
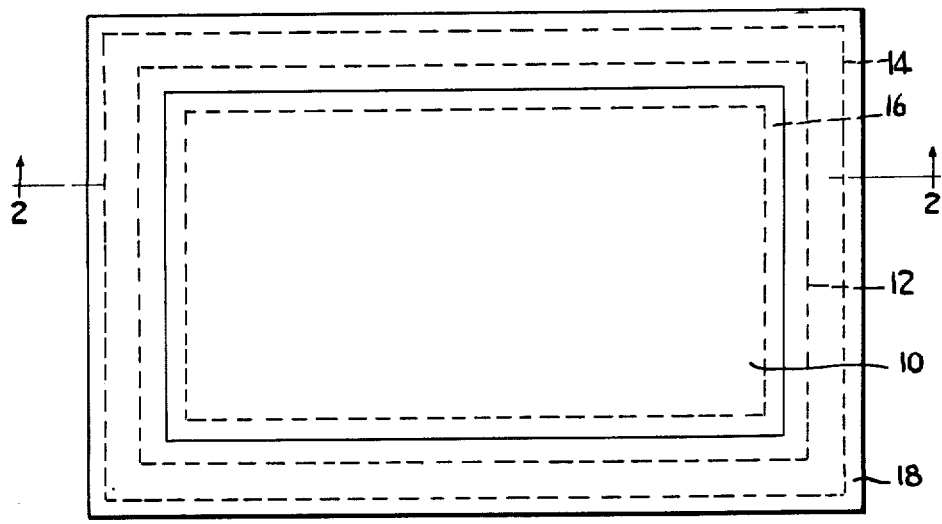

In the drawing:

Figure 1 represents a plan view of a typical safety window closure assembly, and Figure 2 is a perspective view of a portion of a safety window closure assembly showing the manner of building up the edges of the assembly prior to lamination in accordance with the teachings of the present invention. The view of Figure 2 is substantially along the lines 2—2 of Fig. 1 looking roughly in the direction of the arrows.

Referring to the above drawings, a typical laminated safety window assembly is shown. This assembly comprises two sheets 10 and 12 of a rigid, transparent material such as glass or a thermosetting, polyester resin separated by an interlayer 14 of a transparent, thermoplastic material such as polyvinyl butyral. The plastic interlayer extends beyond the periphery of the rigid sheets. The peripheral portion of the plastic interlayer may be reinforced as shown with a ribbon of reinforcing material 16 such as aluminum, some suitable metallic alloy, a reinforced fabric or other material of sufficient rigidity to enable the plastic extension to be firmly attached to a window frame.

Referring to Fig. 2, an assembly provided with peripheral frame members 18 of sufficient dimensions to provide the assembly with smooth upper and lower surfaces and smooth edges is shown. Frame members 18 are preformed in a mold and are of a material that is rigid and thermosetting. The upper frame member 18 fits snugly around the periphery of the cover plate 10 and against the upper surface of the peripheral portion of the lower frame member and of the plastic interlayer 14. The lower frame member fits snugly about the periphery of pressure plate 12 and the plastic interlayer 14 and also against the lower surface of the latter. It is realized, of course, that while the lower frame member is shown as provided with a peripheral flange 19 abutting the entire edge periphery of the interlayer, other modifications wherein the sum total of the flange length is distributed in any other manner between the upper and lower frame members 18 is also contemplated. As an additional precaution to prevent separation of the component parts of the structure, the frame members 18 may be taped together and to the laminated assembly prior to inserting the framed assembly within the pressing bag.

The frame members 18 may be unitary upper and lower frames fitting about the periphery of each rigid sheet 10 and 12 or may each be composed of a plurality of strip like members which can be interfitted, butt welded or mitered together to form a suitable frame.

After the assembly has been provided with framing members 18 of the proper size, the framed assembly is then placed within a pressing bag, the bag evacuated and the entire assembly within the evacuated bag is laminated within an autoclave in accordance with the usual procedure for pressing laminated assemblies.

A typical material found suitable for forming a framing member is vinyl chloride, although other plastisols, plastigels and organosols having sufficient rigidity to maintain their shape, sufficient elasticity to be easily applied and removed from the assembly to be laminated and that do not laminate into the assembly under autoclave conditions may be used. Since autoclave temperatures are usually under 300° F., any material that does not laminate into the assembly at these temperatures or higher is suitable.

A typical procedure to be used includes plasticizing vinyl chloride having particle sizes ranging from about 0.2 to 2 microns in diameter in a suitable plasticizer such as dibutyl sebacate. This plastisol is then poured into a form having inner dimensions equal to those desired for the framing member. The mixture is then plasticized by baking and curing at 350° F. in this form to produce an exact negative of the form. The flexibility of the frame member formed can be controlled by controlling the amount of plasticizer added.

An inert filler such as carbon black or Bentonone may be added to the mixture of vinyl chloride and plasticizer to produce a plastigel that may be worked and molded. The plastigel is given a permanent set by baking and curing at a temperature of 350° F.

The method disclosed in the present application requires the use of fewer materials to build up and bind the edges of the assembly prior to laminating than the prior method. In addition, the vinyl chloride framing members may be re-used. Another advantage is that less labor is required for binding the edges of the framed assembly and in stripping the frame members after lamination than was formerly necessary. Another advantage of the present method lies in the minimization of hand routing and manual handling of the assemblies, which minimizes the possibility of chipping and scratches. Production can be increased because of the elimination of the bottle neck due to the former necessity for more hand processing than is now required. Also, the formation of fillets due to the flow of the plastic interlayer is virtually eliminated by utilizing the snugly fitting frame members presently disclosed.

While the framing operation has been described above as an additional step in the manufacture of a laminated assembly, it is also envisioned that the frame members 18 may be utilized as an assembly jig for assembling a laminated safety window closure. Using such a teaching, one frame is laid on a horizontal support, a first sheet of glass or thermosetting plastic resin inserted within the frame, the interlayer applied, and finally the other sheet of rigid material and its surrounding frame placed atop the interlayer. The assembly is then placed within a pressing bag, pressed within an autoclave and, upon completion of the pressing operation, the frames are then removed from the laminated assembly. For such a use, it is preferable, but not mandatory, that lower frame member 18 be provided with peripheral flange 19 of a height equal to the thickness of the plastic interlayer.

As an alternate embodiment, the frame members 18 may be provided with suitable reinforcements, such as fabric threads or webbing, synthetic fibers, for example, the acrylonitriles or polyamides, in order to reinforce the frame, yet still enable the latter to retain its resiliency.

Since the frame members are molded, they may be formed of any size or shape. Thus, while the frame members are shown in use with flat assemblies in the drawings, the frame members can be shaped to fit around the peripheries of curved assemblies to provide curved, framed assemblies having smooth surfaces and edges in accordance with the teachings of the present invention. Other modifications will become apparent to those skilled in the art.

What is claimed is:

1. A process for the fabrication of a laminated safety window comprising two glass sheets and a thermoplastic sheet bonded to the opposed surfaces of the glass sheets and extending beyond the periphery of each of the glass sheets, which comprises forming an assembly comprising a pair of glass sheets, a thermoplastic sheet therebetween and extending therebeyond, and a pair of rigid frame members, each frame member being in direct abutting relationship with the periphery of one of the glass sheets and with the entire opposing surface of the extension of the thermoplastic sheet and at least one of said frame members having a peripheral flange extending toward and contacting the opposed surface of the other frame member to provide a surface of at least one of said frame members fitting snugly against the entire periphery of the thermoplastic sheet, the frame members having sufficient thickness to provide with the glass sheets an assembly having smooth upper and lower surfaces, placing the assembly in a pressing bag, evacuating the bag, subjecting the assembly in the evacuated bag to an elevated temperature and pressure to bond the thermoplastic sheet to the glass sheets, removing the assembly from the bag, and removing the frame members from around the laminate of the thermoplastic sheet bonded to and extending beyond said glass sheets, each of the pair of frame members being constructed of a material that does not bond at said elevated temperature and pressure to the glass sheets, to the thermoplastic sheet or to the other frame member.

2. A process for the fabrication of a laminated safety window comprising two glass sheets and a thermoplastic sheet bonded to the opposed surfaces of the glass sheets and extending beyond the periphery of each of the glass sheets, which comprises forming an assembly comprising a pair of glass sheets, a thermoplastic sheet therebetween and extending therebeyond, and a pair of rigid frame members, each frame member being in direct abutting relationship with the periphery of one of the glass sheets and with the entire opposing surface of the extension of the thermoplastic sheet and one of said frame members having a peripheral flange extending toward and contacting the opposed surface of the other frame member to provide a surface of the flange fitting snugly against the entire periphery of the thermoplastic sheet, the frame members having sufficient thickness to provide with the glass sheets an assembly having smooth upper and lower surfaces, placing the assembly in a pressing bag, evacuating the bag, subjecting the assembly in the evacuated bag to an elevated temperature and pressure to bond the thermoplastic sheet to the glass sheets, removing the assembly from the bag, and removing the frame members from around the laminate of the thermoplastic sheet bonded to and extending beyond said glass sheets, each of said pair of frame members being constructed of a material that does not bond at said elevated temperature and pressure to the glass sheets, to the thermoplastic sheet or to the other frame member.

3. The process of claim 2 wherein the frame members are molded vinyl chloride polymer and the thermoplastic sheet is a sheet of polyvinyl butyral.

4. A semi-finished safety window closure assembly comprising two glass sheets separated by a thermoplastic interlayer extending beyond the periphery of the glass sheets and a pair of rigid frame members each fitting snugly in direct contact with the periphery of one of the glass sheets and the entire opposing extended surface of the interlayer and at least one of said frame members having a peripheral flange extending toward and contacting the opposed surface of the other frame member to provide a surface of at least one of the frame members fitting snugly against the entire periphery of the interlayer, the frame members providing with the glass sheets smooth upper and lower surfaces, each of said frame members being constructed of a material that does not bond to the glass sheets, to the interlayer or to the other frame member at the elevated temperature and pressure used for bonding the glass sheet to the interlayer.

5. The assembly of claim 4 wherein the frame members are molded vinyl chloride polymer and the interlayer is polyvinyl butyral.

References Cited in the file of this patent

UNITED STATES PATENTS

| | | |
|---|---|---|
| 2,353,473 | Keslar | July 11, 1944 |
| 2,382,956 | Boicey et al. | Aug. 21, 1945 |

FOREIGN PATENTS

| | | |
|---|---|---|
| 373,277 | Great Britain | May 23, 1932 |

Dedication 2,750,312.—*James H. Bloom, Jr.* and *Wyman N. Connor*, New Kensington, Pa.
METHOD OF FABRICATING LAMINATED STRUCTURES.
Patent dated June 12, 1956. Dedication filed July 25, 1973, by the assignee, *PPG Industries, Inc.*

Hereby dedicates the remainder of its term to the free use and benefit of the People of the United States.

[*Official Gazette December 25, 1973.*]